(12) United States Patent
Park et al.

(10) Patent No.: US 8,585,137 B2
(45) Date of Patent: Nov. 19, 2013

(54) VEHICLE SEAT FOR COOLING AND HEATING

(75) Inventors: Jang Su Park, Busan (KR); Chan Uk Park, Hwaseong-si (KR); Man Ju Oh, Ulsan (KR)

(73) Assignees: Hyundai Motor Company, Seoul (KR); Dymos Incorporated, Seosan-Si (KR)

( * ) Notice: Subject to any disclaimer, the term of this patent is extended or adjusted under 35 U.S.C. 154(b) by 103 days.

(21) Appl. No.: 12/871,306

(22) Filed: Aug. 30, 2010

(65) Prior Publication Data

US 2011/0109127 A1    May 12, 2011

(30) Foreign Application Priority Data

Nov. 11, 2009  (KR) .................. 10-2009-0108408

(51) Int. Cl.
A47C 7/74  (2006.01)

(52) U.S. Cl.
USPC ............................... 297/180.14; 297/180.13

(58) Field of Classification Search
USPC ....................... 297/180.13, 180.14
See application file for complete search history.

(56) References Cited

U.S. PATENT DOCUMENTS

| | | | | |
|---|---|---|---|---|
| 5,403,065 | A * | 4/1995 | Callerio | 297/180.14 X |
| 6,019,420 | A * | 2/2000 | Faust et al. | 297/180.14 |
| 6,062,641 | A * | 5/2000 | Suzuki et al. | 297/180.14 X |
| 6,068,332 | A * | 5/2000 | Faust et al. | 297/180.13 |
| 6,196,627 | B1 * | 3/2001 | Faust et al. | 297/180.14 |
| 6,206,465 | B1 * | 3/2001 | Faust et al. | 297/180.14 |
| 6,619,737 | B2 * | 9/2003 | Kunkel et al. | 297/180.14 |
| 6,629,724 | B2 | 10/2003 | Ekern et al. | |
| 6,682,140 | B2 * | 1/2004 | Minuth et al. | 297/180.14 |
| 6,808,230 | B2 * | 10/2004 | Buss et al. | 297/180.14 X |
| 7,478,869 | B2 * | 1/2009 | Lazanja et al. | 297/180.14 |
| 7,673,935 | B2 * | 3/2010 | Nishide et al. | 297/180.14 |
| 7,735,932 | B2 * | 6/2010 | Lazanja et al. | 297/180.14 X |
| 7,775,602 | B2 * | 8/2010 | Lazanja et al. | 297/180.14 X |
| 7,931,330 | B2 * | 4/2011 | Itou et al. | 297/180.14 |
| 7,971,931 | B2 * | 7/2011 | Lazanja et al. | 297/180.14 |
| 8,191,187 | B2 * | 6/2012 | Brykalski et al. | 297/180.13 X |
| 2006/0175877 | A1 * | 8/2006 | Alionte et al. | 297/180.14 |
| 2009/0121525 | A1 * | 5/2009 | Nishide et al. | 297/180.13 |
| 2009/0134675 | A1 | 5/2009 | Pfahler | |
| 2013/0097777 | A1 * | 4/2013 | Marquette et al. | 297/180.13 X |

FOREIGN PATENT DOCUMENTS

| | | |
|---|---|---|
| JP | 2001-190358 A | 7/2001 |
| JP | 2006-69376 A | 3/2006 |
| JP | 2007-202668 A | 8/2007 |
| JP | 2009-77760 A | 4/2009 |

* cited by examiner

*Primary Examiner* — Rodney B White
(74) *Attorney, Agent, or Firm* — Morgan, Lewis & Bockius LLP

(57) ABSTRACT

A vehicle seat for cooling and heating may include a seat pad, a mesh sheet having a certain thickness, a first film, and a porous seat cover, which are arranged sequentially in the direction in which air is introduced to flow. The seat pad has a pad hole, which allows air to pass through, and includes one or both of a seat cushion pad, which supports the buttocks of a user, and a seatback pad, which supports the upper body of the user. The mesh sheet has a porous network structure, through which air easily passes. The first film has a first film hole, which allows air to pass through. Air passages are maintained stable to maximize blowing performance, seating comfort is improved, and a ventilation structure is simplified to reduce manufacturing costs while improving productivity.

6 Claims, 9 Drawing Sheets

VEHICLE SEAT FOR COOLING AND HEATING

CROSS REFERENCE TO RELATED APPLICATION

The present application claims priority to Korean Patent Application Number 10-2009-0108408, filed on Nov. 11, 2009, the entire contents of which application are incorporated herein for all purposes by this reference.

BACKGROUND OF THE INVENTION

1. Field of the Invention

The present invention relates to a vehicle seat for cooling and heating, and more particularly, to a vehicle seat for cooling and heating which includes a seat pad, a mesh sheet having a certain thickness, a first film, and a porous seat cover, which are arranged sequentially in the direction in which air is introduced to flow, the seat pad having a pad hole, which allows air to pass through, and including one or both of a seat cushion pad, which supports the buttocks of a user, and a seatback pad, which supports the upper body of the user, the mesh sheet having a porous network structure, through which air easily passes, and the first film having a first film hole, which allows air to pass through.

2. Description of Related Art

A vehicle seat generally includes a resin pad, which fills the inside of the vehicle seat, and a vinyl or leather cover, which encloses the resin pad. However, the vehicle seat having such a structure does not provide good ventilation. In summer, a driver may feel uncomfortable due to sweat moistening the buttocks, which are in contact with the seat. This may act as a factor that causes the driver to lose concentration while driving. Accordingly, a lot of research is underway to improve the ventilation of the vehicle seat.

FIG. 1A is a cross-sectional view showing a conventional vehicle seat, and FIG. 1B is a perspective view showing another conventional vehicle seat.

FIG. 1A shows a ventilation structure including an air hole, which is formed in a seat pad 10 such that air can flow in the vertical direction, and passages, which are formed in the upper portion of the seat pad 10 such that air can spread in the horizontal direction. In addition, a seat cover 20 encloses the ventilation structure. Although the ventilation structure shown in FIG. 1A has the advantage of having a simple structure, it also has the following drawbacks. When a user sits on the seat, the passages extending in the horizontal direction are closed by the pressure applied by the user's buttocks, thus degrading ventilation performance. In addition, this structure is too expensive because the mold of the seat pad 10 has to be changed in order to improve its performance.

FIG. 1B shows a ventilation structure in which a separate structure 30 is inserted into a seat pad 10 in order to form passages through which air can pass. The approach shown in FIG. 1B has merits such as good blowing performance and adjustability of blowing positions. However, since the inserted structure 30 is located in the upper end portion of the seat, the user can feel the presence of a foreign body when seated on the seat. That is, the inserted structure 30 decreases the softness of the seat.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a vehicle seat for cooling and heating, in which air passages are maintained stable in order to maximize blowing performance, seating comfort is improved so that a user does not sense a foreign body when seated on the vehicle seat, and a ventilation structure can be simplified to reduce manufacturing costs while improving productivity.

Also provided is a vehicle seat for cooling and heating, in which blowing performance and blowing positions can be changed at low cost.

In an aspect of the present invention, the vehicle seat may include a seat pad having a pad hole, which allows air to pass through, wherein the seat pad includes at least a seat cushion pad, which supports buttocks of a user, and a seatback pad, which supports an upper body of the user, a mesh sheet disposed on the seat pad and having a porous network structure, through which the air passes, a first film disposed on the mesh sheet and having a first film hole, which allows the air to pass through, and a porous seat cover disposed on the first film, wherein the seat pad, the mesh sheet, the first film, and the seat cover are arranged sequentially according to a direction in which the air is introduced to flow, and wherein the mesh sheet has a predetermined thickness.

The mesh sheet may be made up of flexible but incompressible material.

The vehicle seat may further include a second film disposed between the seat pad and the mesh sheet, wherein the second film has a second film hole therein to fluid-communicate with the first film hole through the mesh sheet and with the pad hole, wherein number of the second film hole is smaller than the number of the first film hole, wherein the second film, the mesh sheet, and the first film are provided inside the porous seat cover, and wherein the second film, the mesh sheet, and the first film are wrapped in sequence inside the porous seat cover.

In another aspect of the present invention, the vehicle seat may include a film having a film hole, which allows temperature-controlled air to pass through, a mesh sheet disposed on the film and having a porous network structure, through which the air passes, a seat pad disposed on the mesh sheet and having pad holes, which allow the air to pass through, wherein the seat pad includes at least a seat cushion pad, which supports buttocks of a user, and a seatback pad, which supports an upper body of the user, and a porous seat cover disposed on the seat pad, wherein the film, the mesh sheet, the seat pad, and the seat cover are arranged sequentially according to a direction in which the air is introduced to flow, and wherein the mesh sheet has a predetermined thickness, wherein the mesh sheet is made up of flexible but incompressible material.

The mesh sheet may include a pair of blowing mesh portions, extending in a longitudinal direction in which the pad holes are formed to fluid-communicate therebetween, and a supply mesh portion communicating with the blowing mesh portions and the film hole to supply the air to the blowing mesh portions.

The pad holes may be located in surface portions of the seat cover with which body parts of the user come into contact.

In further another aspect of the present invention, the vehicle seat may include a seat pad having a pad hole, which allows air to pass through, wherein the seat pad includes at least a seat cushion pad, which supports buttocks of a user, and a seatback pad, which supports an upper body of the user, a mesh sheet disposed on the seat pad and having a porous network structure, through which the air passes, a spreading film disposed on the mesh sheet and including a spread-inducing portion, which covers the pad hole, and a blow-preventing portion, which extends from the spread-inducing portion, and a porous seat cover disposed on the mesh sheet and the spreading film, wherein the seat pad, the mesh sheet, the spreading film, and the seat cover are arranged sequentially according to a direction in which the air is introduced to flow, and wherein the mesh sheet has a predetermined thickness, wherein the mesh sheet is made up of flexible but incompressible material and, wherein the area of the spreading film is smaller than the area of the mesh sheet.

According to exemplary embodiments of the present invention as set forth above, the vehicle seat for cooling and heating has the following effects:

First, air passages are maintained stable to maximize blowing performance, seating comfort is improved so that the user does not sense a foreign body when seated on the vehicle seat, and the simplified ventilation structure can reduce manufacturing costs while improving productivity.

In addition, the blowing performance and blowing positions of the vehicle seat for cooling and heating can be changed at low cost.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1A:
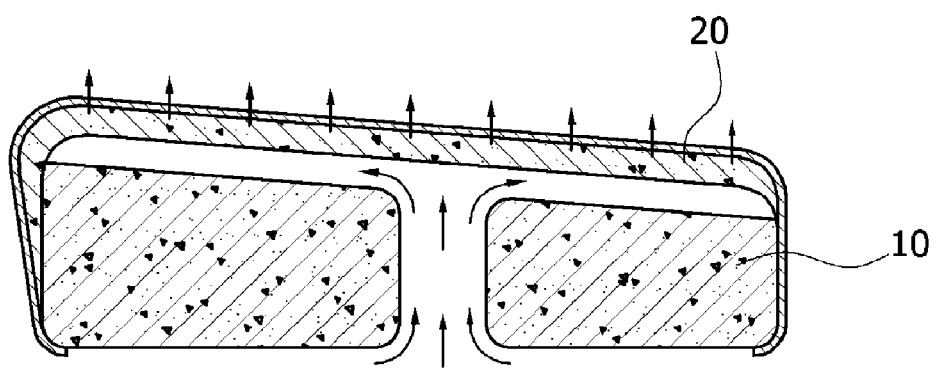
FIGS. 1A and 1B show conventional vehicle seats.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2A:
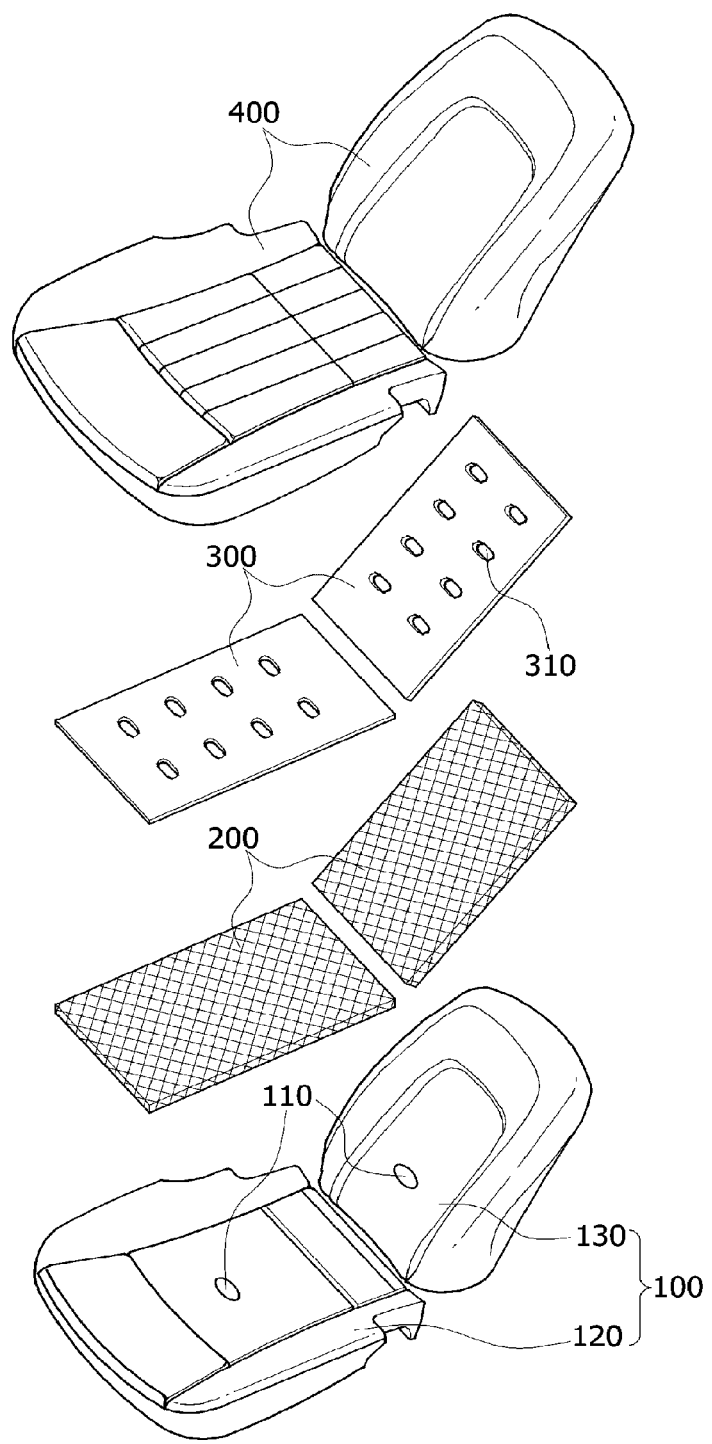
FIG. 2A is an exploded perspective view showing an exemplary vehicle seat according to the invention.
Figure 2B:
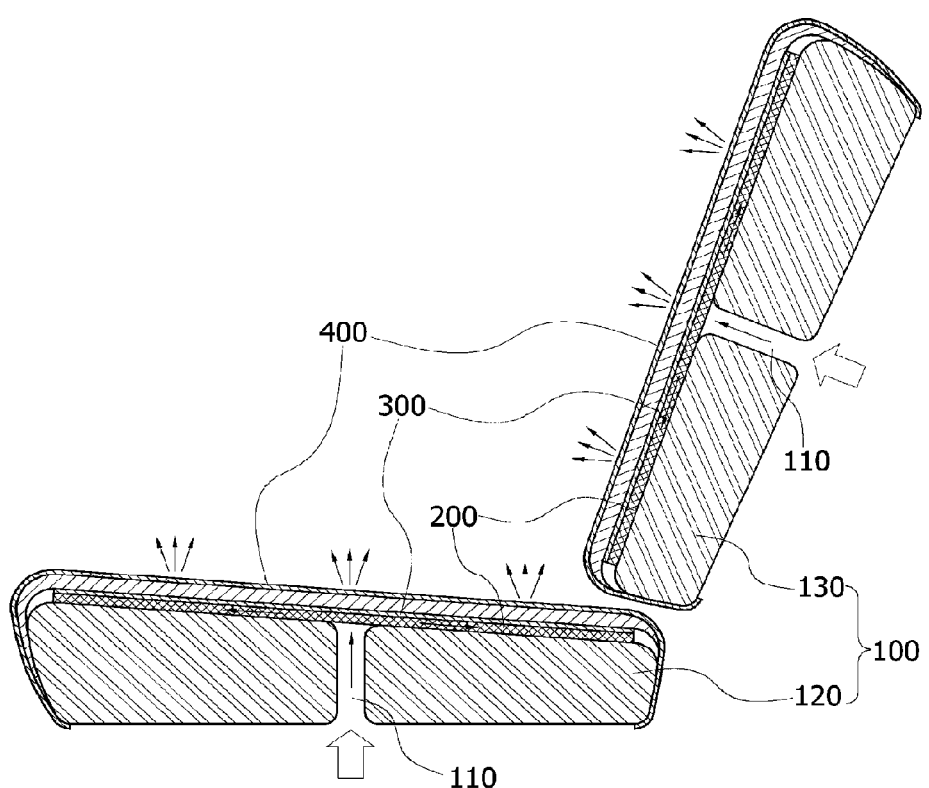
FIG. 2B is a cross-sectional view of the vehicle seat shown in FIG. 2A, showing the flow of air inside the seat.
Figure 3A:
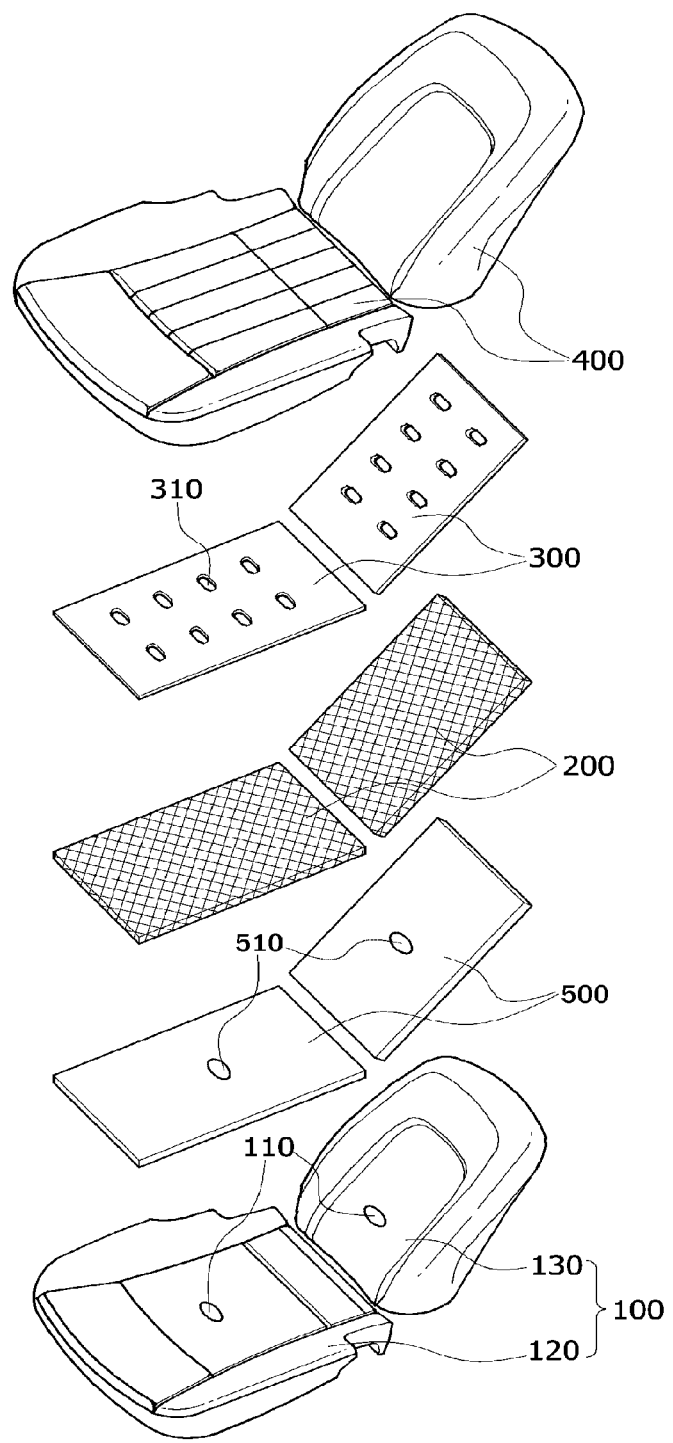
FIG. 3A is an exploded perspective view showing an exemplary vehicle seat according to the invention.
Figure 3B:
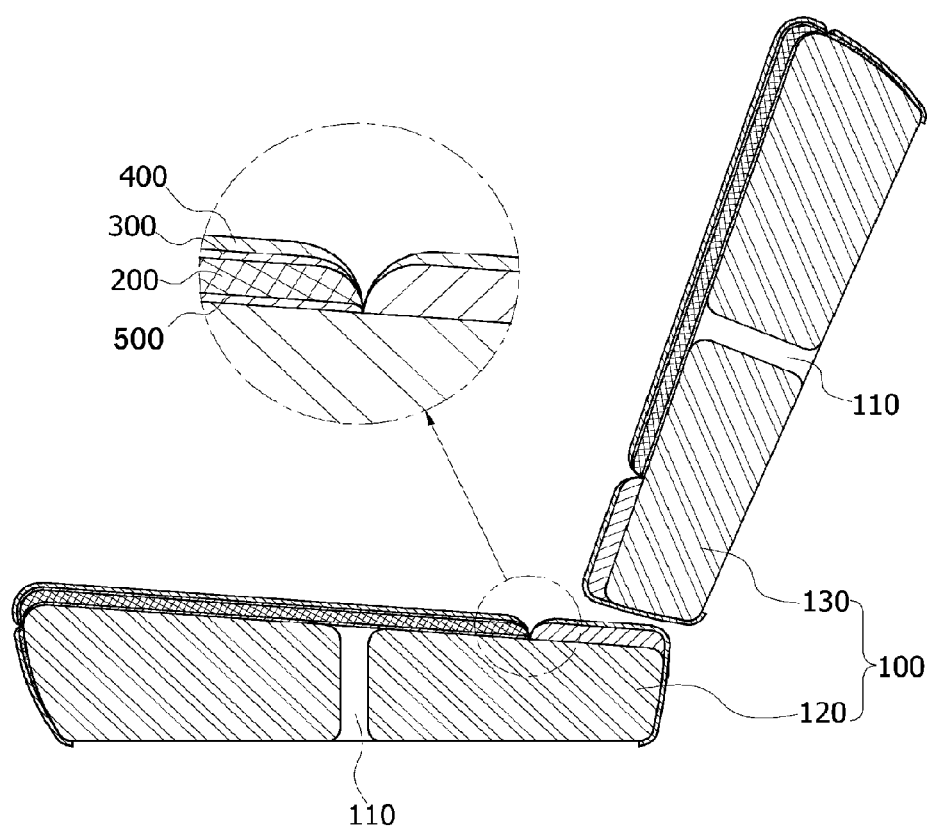
FIG. 3B is a cross-sectional view of the vehicle seat shown in FIG. 3A, showing the flow of air inside the seat.
Figure 4A:
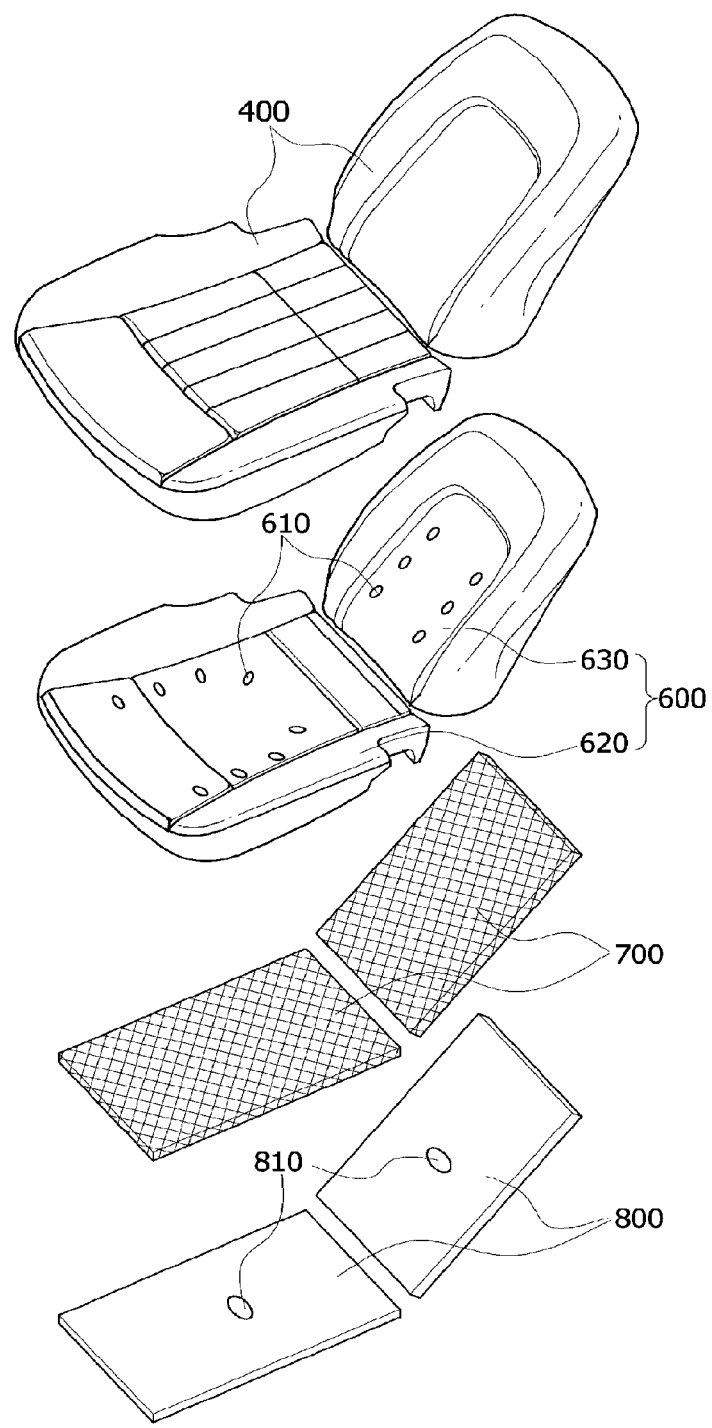
FIG. 4A is an exploded perspective view showing an exemplary vehicle seat according to the invention.
Figure 4B:
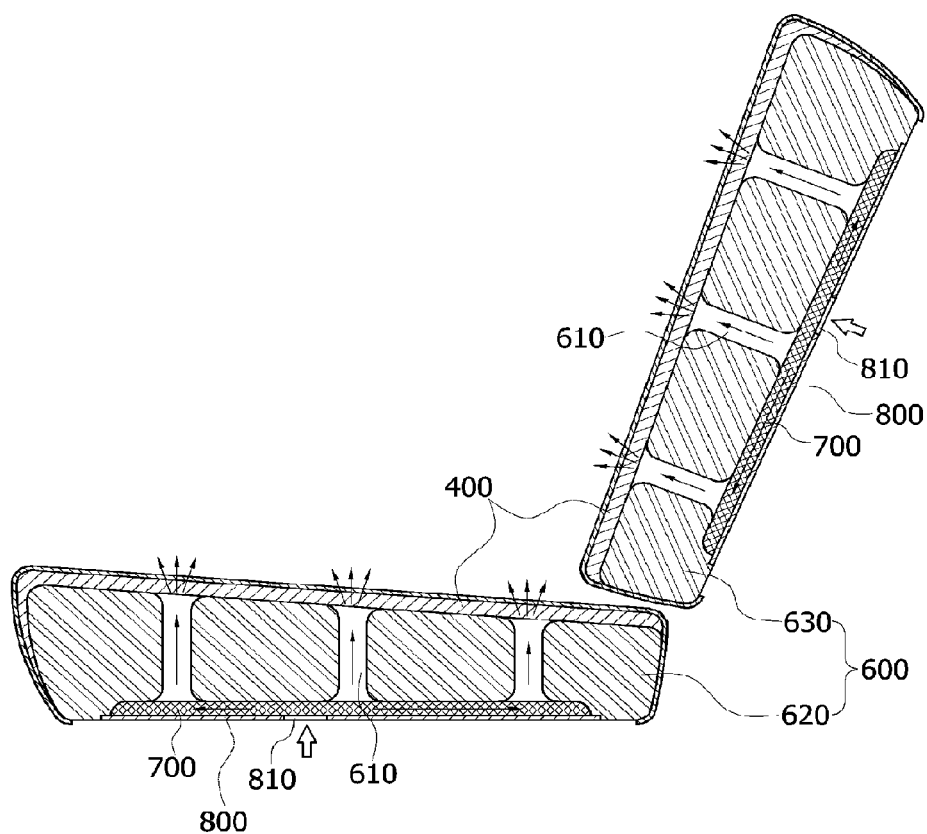
FIG. 4B is a cross-sectional view of the vehicle seat shown in FIG. 4A, showing the flow of air inside the seat.
Figure 5:
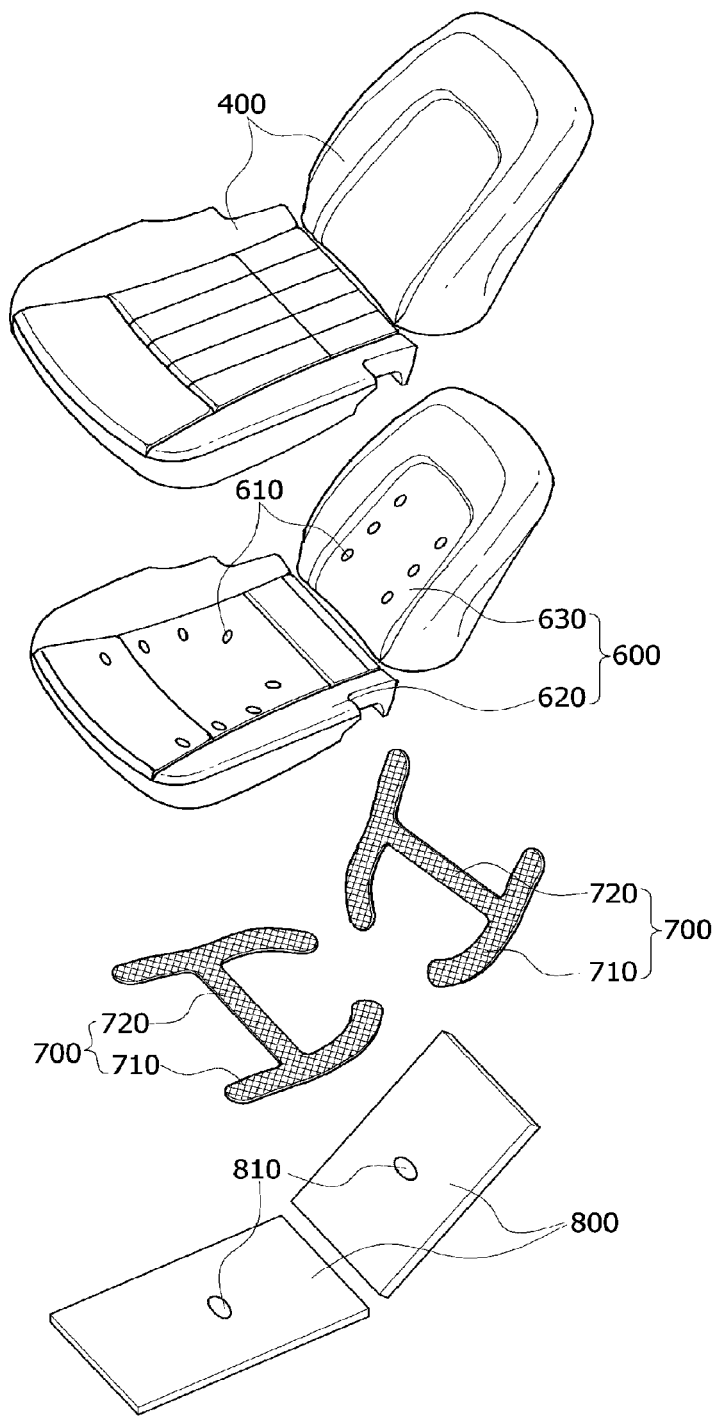
FIG. 5 is an exploded perspective view showing an exemplary vehicle seat according to the present invention, in which a mesh structure is modified.
Figure 6:
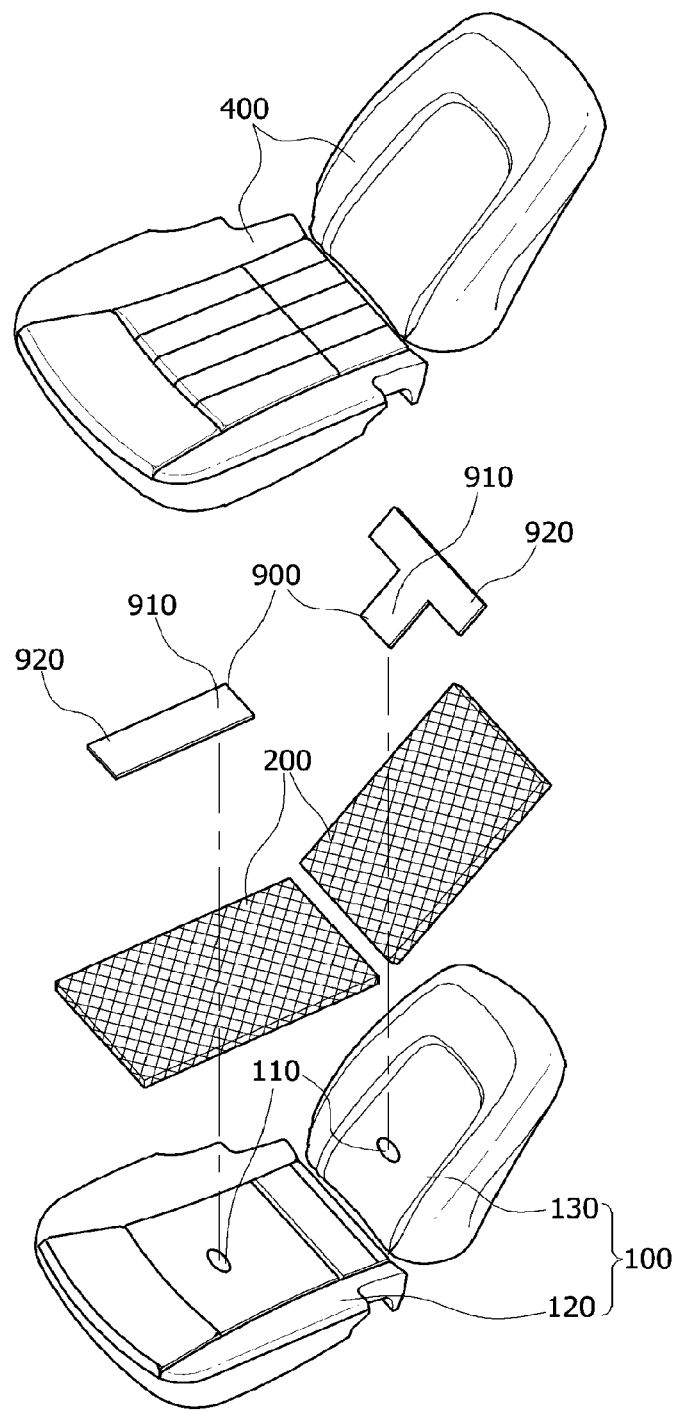
FIG. 6 is an exploded perspective view showing an exemplary vehicle seat according to the present invention, in which a film shape is modified.

FIG. 2A is an exploded perspective view showing a vehicle seat according to one exemplary embodiment of the present invention, FIG. 2B is a cross-sectional view of the vehicle seat shown in FIG. 2A, showing the flow of air inside the seat, FIG. 3A is an exploded perspective view showing a vehicle seat according to another exemplary embodiment of the present invention, FIG. 3B is a cross-sectional view of the vehicle seat shown in FIG. 3A, showing the flow of air inside the seat, FIG. 4A is an exploded perspective view showing a vehicle seat according to a further exemplary embodiment of the present invention, FIG. 4B is a cross-sectional view of the vehicle seat shown in FIG. 4A, showing the flow of air inside the seat, FIG. 5 is an exploded perspective view showing a vehicle seat according to still another exemplary embodiment of the present invention, in which a mesh structure is modified, and FIG. 6 is an exploded perspective view showing a vehicle seat according to yet another exemplary embodiment of the present invention, in which a film shape is modified.

The vehicle seat according to an exemplary embodiment of the present invention includes a seat pad 100, a mesh sheet 200, a first film 300, and a seat cover 400, which are arranged sequentially in the direction in which air is introduced to flow. The seat pad 100 includes a seat cushion pad 120, which supports the buttocks of a user, and a seatback pad 130, which supports the upper body of the user. A pad hole 110, which allows air to pass through, is formed in each of the seat cushion pad 120 and the seatback pad 130. The mesh sheet 200 has a porous network structure, through which air can easily pass. The first film 300 has a first film hole 310, which allows air to pass through. In addition, the mesh sheet 200 has a certain thickness.

As an alternative, the seat pad 100 can include the seat cushion pad 120 or the seatback pad 130 only. In this case, the mesh sheet 200, the first film 300, and the seat cover 400 can be selectively provided on either the seat cushion side or the seatback side.

The seat pad 100 basically serves to support the user. Accordingly, the seat pad 100 is made of an elastic material such as rubber in order to provide seating comfort to the user. In addition, the seat cover 400 is manufactured to have a porous structure that can supply air, which is introduced through the pad hole 110, to the user by dividing it into a number of small air streams. For this, a sponge is inserted inside the seat cover 400. In addition, the seat cover 400 is generally attached to the side of the vehicle seat with which the body of the user is supposed to come into contact. A detailed description thereof will be omitted since the seat cover is substantially the same as a pad or cover of the kind generally used in vehicle seats.

As shown in FIG. 2A, the mesh sheet 200 has a network structure through which air can easily pass. Accordingly, when air is supplied from the pad hole 110 in the seat pad 100, air can spread across the entire area of the mesh sheet 200.

It is preferable that the mesh sheet 200 be made of a material that is flexible but not compressible. This is to prevent the mesh sheet 200 from being compressed by the weight of the user. If the mesh sheet 200 is compressed, passages through which air flows may be blocked.

Figure 1B:
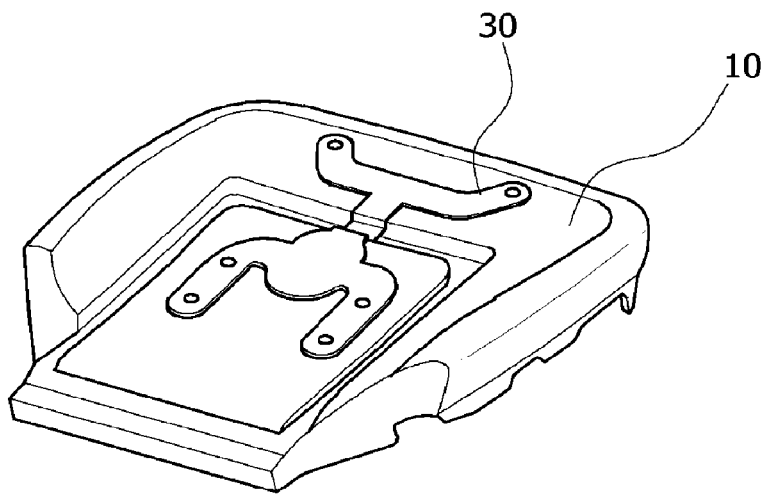

Conventional ventilation structures have a drawback in that they cannot be used for an article that has a thin pad 10, as shown in FIGS. 1A and 1B. In the conventional ventilation structure shown in FIG. 1A, air passages are formed directly in the upper portion of the pad 10. If the pad 10 is thin, it is difficult to maintain the air passages, and the blowing performance may consequently suffer. Even if the air passages are maintained, the air passages formed inside the pad further reduce the thickness of the pad, thereby making it uncomfortable to sit on. Also, in the conventional ventilation structure shown in FIG. 1B, a decrease in the thickness of the pad 10 may increase the sensation of a foreign body due to the structure 30.

However, this exemplary embodiment of the present invention can maintain the air passages in a stable state while improving seating comfort regardless of the thickness of the pad 100 because the separate mesh sheet 200 is provided. This is because the air passages are formed inside the mesh sheet 200 in this exemplary embodiment.

The first film 300, which is attached to the mesh sheet 200, is made of an air-impermeable material. This is to prevent air from uncontrollably exiting the seat once it has been supplied to the mesh sheet 200. Instead, the first film 300 has formed therein first film holes 310, which allow air to pass through, so that air can exit the seat through the first film holes 310.

Accordingly, as shown in FIG. 2B, when air is supplied to the mesh sheet 200 through the pad holes 110, it is spread across the entire area of the mesh sheet 200, and is then introduced to the seat cover 400 through the first film holes 310. Afterwards, air is divided again into a greater number of streams through the cover 400 before being blown at the user.

It is possible to change the blowing position or performance by changing the positions, sizes, and number of the first film holes 310. That is, it is possible for the user to adjust the blowing performance by changing the positions of the first film holes 310 as well as increasing or decreasing the sizes or number of the first film holes 310. As such, in this exemplary embodiment, it is possible to change the blowing positions and performance by changing the positions, sizes, and number of the first film holes 310 in the first film 300. Accordingly, it costs little to change the blowing positions and blowing performance.

According to another exemplary embodiment of the present invention, a second film 500, which has second film holes 510, is added between the seat pad 100 and the mesh sheet 200.

The mesh sheet 200 may be difficult to bond to the seat pad 100 since it has a network structure. In order to solve this problem, as shown in FIG. 3A, a second film 500 having a chemical composition similar to that of the mesh sheet 200 is used. The similarity of the chemical composition facilitates bonding therebetween. In addition, the second film 500 has the second film holes 510 formed therein in order to efficiently carry air, supplied from the pad holes 110, to the mesh sheet 200.

The second film 500, the mesh sheet 200, and the first film 300 are provided inside the seat cover 400.

In general, a sponge is inserted inside the seat cover in order to improve softness. In an exemplary embodiment of the present invention, as shown in FIG. 3B, the second film 500, the mesh sheet 200, and the first film 300 are used instead of the sponge such that they are stacked sequentially on one another inside the seat cover 400.

As shown in FIG. 3B, when the seat cover 400 is manufactured by providing the second film 500, the mesh sheet 200, and the first film 300 inside the seat cover 400, it is possible to manufacture the vehicle seat by simply wrapping the seat cover 400 around the seat pad 100 without requiring any additional processing. When the seat is manufactured in this way, manufacturing costs are reduced since no sponge is used, and manufacturing speed is excellent since the seat is manufactured merely by wrapping the seat cover 400 around the seat pad 100.

According to a further exemplary embodiment, the vehicle seat includes a third film 800, a mesh sheet 700, a seat pad 600, and a porous seat cover 400, which are arranged sequentially according to the direction in which air is introduced to flow. The film 800 has film holes therein, which allow temperature-controlled air to pass through. The mesh sheet 700 has a porous network structure, through which air can easily pass. The seat pad 600 includes a seat cushion pad 620, which supports the buttocks of a user, and a seatback pad 630, which supports the upper body of the user. Pad holes 610 are formed in the seat cushion pad 620 and the seatback pad 630. In addition, the mesh sheet 700 has a certain thickness.

The third film 800 is made of an air-impermeable material. This serves to prevent air from uncontrollably exiting the seat once it has been supplied to the mesh sheet 700, and to prevent air that is not temperature-controlled from being uncontrollably supplied to the mesh sheet 700 through the surface of the third film 800.

As shown in FIG. 4A, the mesh sheet 700 has a network structure, through which air can easily pass. Accordingly, when air is supplied from the third film holes 810, air can spread across the entire area of the mesh sheet 700.

It is preferable that the mesh sheet 700 be made of a material that is flexible but not compressible. This is to prevent the mesh sheet 700 from being compressed by the load of the user. If the mesh sheet 700 is compressed, passages through which the air flows may be blocked.

Conventional ventilation structures have a drawback in that they cannot be used for an article that has a thin pad, as shown in FIGS. 1A and 1B. However, this exemplary embodiment of the present invention can maintain the air passages in a stable state while improving seating comfort, regardless of the thickness of the pad 100, because the separate mesh sheet 700 is provided. This is because the air passages are formed inside the mesh sheet 700 in this exemplary embodiment.

Accordingly, as shown in FIG. 4B, when air is supplied to the mesh sheet 700 through the third film hole 810, it is spread across the entire area of the mesh sheet 700, and is then introduced to the seat cover 400 through the pad hole 610. Afterwards, air is divided again into a greater number of streams through the cover 400 before being blown at the user.

According to still another exemplary embodiment of the present invention, the mesh sheet 700 includes a pair of blowing mesh portions 710 and a supply mesh portion 720. The blowing mesh portions 710 extend in the longitudinal direction and are engaged with the pad holes 610, and the supply mesh portion 720 communicates with the blowing mesh portions 710 to supply air to the blowing mesh portions 710.

The mesh sheet 700 is basically configured to cover all of the pad holes 610 since it has to supply air to all of the pad holes 610 in the pad 600. However, if the mesh sheet 700 is configured simply to cover the entire seat pad 600, air becomes congested in the portions of the seat pad 700 where the pad holes 610 are not formed. The air congestion disturbs the supply of air through the third film holes 810 as well as the exhaust of air through the pad holes 610. This is because the accumulated air causes turbulence inside the passages.

Accordingly, in this exemplary embodiment, as shown in FIG. 5, the mesh sheet 700 is designed to include a pair of the blowing mesh portions 710, which extend in the longitudinal direction and is engaged with the pad holes 610, and the supply mesh portion 720, which is engaged with the third film hole 810 and communicates with the blowing mesh portions 710 to supply air received from the third film hole 810 to the blowing mesh portions 710, so that air can be efficiently exhausted through the pad holes 610 without congestion when supplied to the mesh sheet 700. This design consequently improves blowing performance.

However, it is preferable that the outer circumferences of the supply mesh portion 720 and the blowing mesh portions 710 be maintained airtight in order to prevent air from escaping therefrom.

It is preferable that the pad holes 610 be located in surface portions of the seat cover 400 with which body parts of the user come into contact.

The temperature-controlled air can be wasted if air is blown from a position that is not in contact with the body of the user. If the inside of a vehicle is separated from the outside by the vehicle body, this is not a severe problem because the temperature-controlled air is used to control the temperature of the inside of the vehicle even if it is blown from positions not in contact with the body of the user. However, in an open convertible, the inside of which is not isolated from the outside, the temperature-controlled air is simply blown outside the vehicle when blown from a position not in contact with the body of the user.

According to yet another exemplary embodiment of the present invention, the vehicle seat includes a seat pad 100, a mesh sheet 200, a spreading film 900, and a seat cover 400, which are arranged sequentially according to the direction in which air is introduced to flow. The seat pad 100 includes a seat cushion pad 120, which supports the buttocks of a user, and a seatback pad 130, which supports the upper body of the user. A pad hole 110, which allows air to pass through, is formed in each of the seat cushion pad 120 and the seatback pad 130. The mesh sheet 200 has a porous network structure, through which air can easily pass. The spreading film 900 includes spread-inducing portions 910, each of which is located right above a respective pad hole 110, and blow-preventing portions 920, each of which extends from a respective spread-inducing portion 910. In addition, the mesh sheet 200 has a certain thickness.

Returning to FIG. 3, air, which has passed through the pad holes 110, spreads through the inside of the mesh sheet 200, and is then blown at the user through the first film holes 310. If a first film hole 310 is located right above a pad hole 110, air that has passed through the pad hole 110 may not be evenly spread when it is blown, but may be blown through only the first film hole 310, which is located right above the pad hole 110.

Accordingly, as shown in FIG. 6, this exemplary embodiment provides the spreading film 900, which is made of an air-blocking material and includes the spread-inducing portions 910 and blow-preventing portions 920.

Each of the spread-inducing portions 910 is located right above a respective pad hole 110, and induces air, which is supplied through the pad hole 110, to spread inside the mesh sheet 200 instead of directly passing through the mesh sheet 200.

Each of the blow-preventing portions 920 extends from the respective spread-inducing portion 910, and allows the temperature-controlled air to be blown at positions at which it is necessary to blow air while preventing air from being blown at positions at which it is not necessary to blow air.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A vehicle seat comprising:
  a seat pad having a pad hole, which allows air to pass through, wherein the seat pad includes at least a seat cushion pad, which supports buttocks of a user, and a seatback pad, which supports an upper body of the user;
  a mesh sheet disposed on the seat pad and having a porous network structure, through which the air passes;
  a first film disposed on the mesh sheet and having a first film hole, which allows the air to pass through; and
  a porous seat cover disposed on the first film,
  wherein the seat pad, the mesh sheet, the first film, and the seat cover are arranged sequentially according to a direction in which the air is introduced to flow, and
  wherein the mesh sheet has a predetermined thickness.

2. The vehicle seat according to claim 1, wherein the mesh sheet is made up of flexible but incompressible material.

3. The vehicle seat according to claim 1, further comprising a second film disposed between the seat pad and the mesh sheet, wherein the second film has a second film hole therein to fluid-communicate with the first film hole through the mesh sheet and with the pad hole.

4. The vehicle seat according to claim 3, wherein number of the second film hole is smaller than the number of the first film hole.

5. The vehicle seat according to claim 3, wherein the second film, the mesh sheet, and the first film are provided inside the porous seat cover.

6. The vehicle seat according to claim 3, wherein the second film, the mesh sheet, and the first film are wrapped in sequence inside the porous seat cover.

\* \* \* \* \*